US012665785B2

(12) United States Patent
Cai et al.

(10) Patent No.: US 12,665,785 B2
(45) Date of Patent: Jun. 23, 2026

(54) DATA COMMUNICATIONS OVER VIRTUAL LOCAL AREA NETWORKS (VLANS) AND WIRELESS COMMUNICATION NETWORKS

(71) Applicant: T-MOBILE INNOVATIONS LLC, Overland Park, KS (US)

(72) Inventors: Zheng Cai, Fairfax, VA (US); Zheng Fang, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 728 days.

(21) Appl. No.: 18/158,271

(22) Filed: Jan. 23, 2023

(65) Prior Publication Data

US 2024/0250846 A1     Jul. 25, 2024

(51) Int. Cl.
*H04L 12/46*          (2006.01)
*H04L 12/28*          (2006.01)
*H04W 28/02*          (2009.01)

(52) U.S. Cl.
CPC ...... *H04L 12/4641* (2013.01); *H04L 12/2856* (2013.01); *H04W 28/0268* (2013.01)

(58) Field of Classification Search
CPC ........... H04L 12/4641; H04L 12/2856; H04W 28/0268
See application file for complete search history.

(56) References Cited

U.S. PATENT DOCUMENTS 8,185,127 B1     5/2012  Cai et al.
9,608,715 B1     3/2017  Fang

| | | | |
|---|---|---|---|
| 9,930,526 B2 | 3/2018 | Huber et al. | |
| 10,070,461 B2 * | 9/2018 | Nuggehalli | ......... H04W 72/542 |
| 10,142,911 B2 | 11/2018 | Fang | |
| 10,666,349 B2 | 5/2020 | Fang | |
| 10,812,629 B2 | 10/2020 | Park et al. | |
| 10,951,427 B2 | 3/2021 | Qiao et al. | |
| 11,006,316 B2 | 5/2021 | Qiao et al. | |
| 11,265,957 B2 | 3/2022 | Fang et al. | |
| 11,737,128 B2 * | 8/2023 | Ohta | ................... H04L 12/1403 |
| 11,930,439 B2 * | 3/2024 | Paranjpe | ............... H04W 48/18 |
| 11,930,548 B2 * | 3/2024 | Alam | ..................... H04W 76/15 |
| 12,010,053 B2 * | 6/2024 | Khoryaev | ........... H04L 27/2613 |
| 2018/0368047 A1 * | 12/2018 | Patil | ...................... H04L 45/245 |
| 2019/0124545 A1 * | 4/2019 | Gandhi | ................. H04W 36/14 |
| 2019/0254057 A1 * | 8/2019 | Hampel | ............... H04J 3/0635 |
| 2020/0374956 A1 * | 11/2020 | Zhu | ........................ H04W 28/10 |
| 2020/0404540 A1 * | 12/2020 | Kerpez | ............. H04W 28/0268 |
| 2021/0127271 A1 | 4/2021 | Wu | |
| 2021/0409999 A1 * | 12/2021 | Chilla | ............... H04W 28/0252 |
| 2022/0286391 A1 * | 9/2022 | Agarwal | ............... H04L 45/308 |

(Continued)

*Primary Examiner* — Blake J Rubin

(57) ABSTRACT

A wireless communication device determines QoS levels for wireless network links. The wireless communication device associates the QoS levels for the wireless network links with a Virtual Local Area Network (VLAN). The wireless communication device indicates to a user communication device the association of the QoS levels for the wireless network links with the VLAN. The wireless communication device exchanges the user data with the user communication device over the VLAN using the QoS levels for the wireless network links that are associated with the VLAN. The wireless communication device wirelessly exchanges the user data over the wireless network links using the QoS levels for the wireless network links.

20 Claims, 10 Drawing Sheets

(56)                 References Cited

U.S. PATENT DOCUMENTS

| | | | | |
|---|---|---|---|---|
| 2022/0321485 A1* | 10/2022 | Rost | ..................... | H04L 47/562 |
| 2023/0019215 A1* | 1/2023 | Wang | ................. | H04L 12/1407 |
| 2023/0075078 A1* | 3/2023 | Qiang | ............. | H04W 72/0446 |
| 2023/0353455 A1* | 11/2023 | Zhu | .................... | H04L 41/0895 |
| 2024/0039792 A1* | 2/2024 | Berzin | ................... | H04L 67/60 |
| 2024/0235990 A9* | 7/2024 | Metsala | ............... | H04L 49/354 |
| 2024/0305533 A1* | 9/2024 | Bai | ...................... | H04W 24/02 |

* cited by examiner

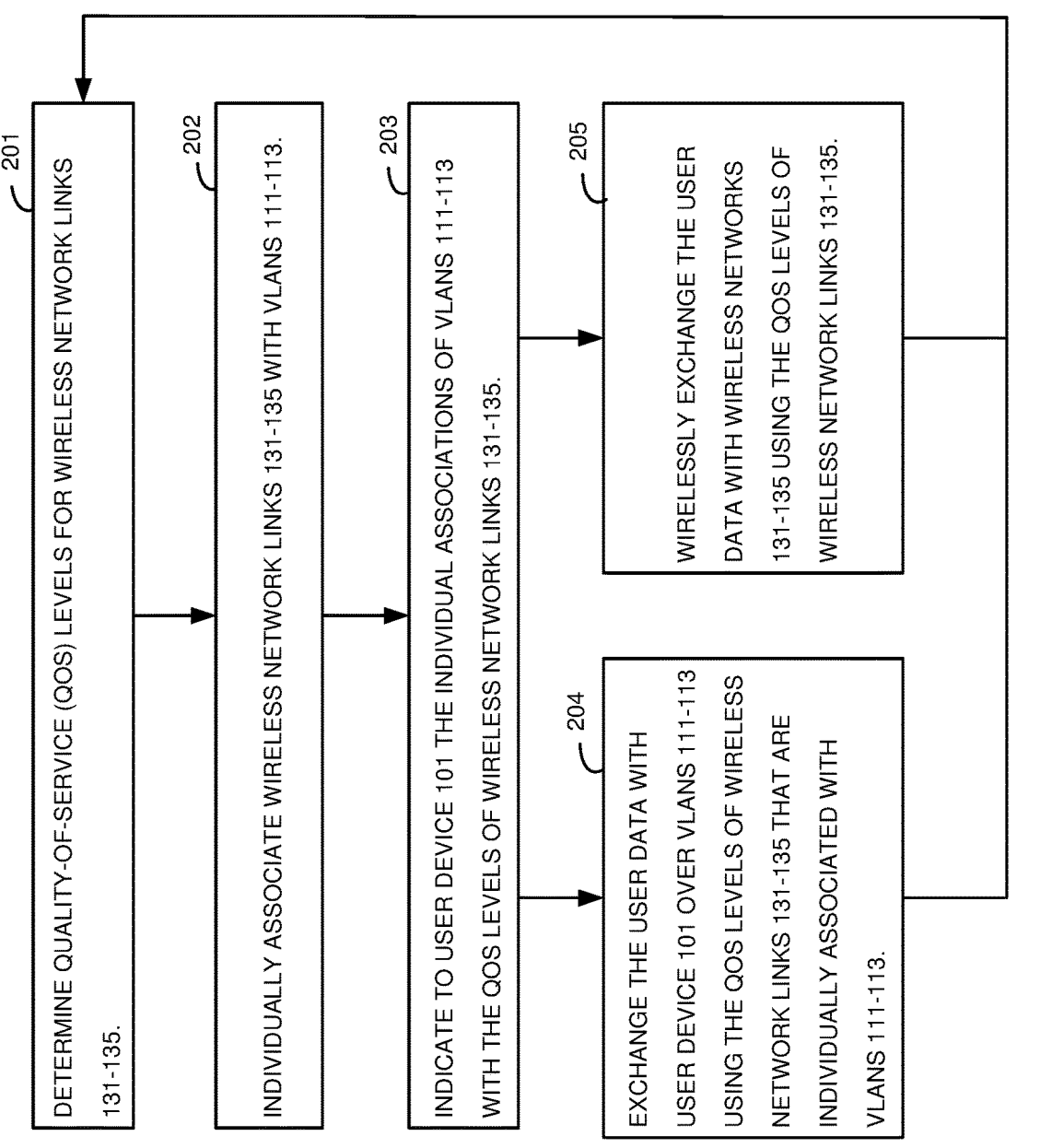

201 DETERMINE QUALITY-OF-SERVICE (QOS) LEVELS FOR WIRELESS NETWORK LINKS 131-135.

202 INDIVIDUALLY ASSOCIATE WIRELESS NETWORK LINKS 131-135 WITH VLANS 111-113.

203 INDICATE TO USER DEVICE 101 THE INDIVIDUAL ASSOCIATIONS OF VLANS 111-113 WITH THE QOS LEVELS OF WIRELESS NETWORK LINKS 131-135.

204 EXCHANGE THE USER DATA WITH USER DEVICE 101 OVER VLANS 111-113 USING THE QOS LEVELS OF WIRELESS NETWORK LINKS 131-135 THAT ARE INDIVIDUALLY ASSOCIATED WITH VLANS 111-113.

205 WIRELESSLY EXCHANGE THE USER DATA WITH WIRELESS NETWORKS 131-135 USING THE QOS LEVELS OF WIRELESS NETWORK LINKS 131-135.

NETWORK DATA CENTER 700

NF SOFTWARE 705

AMF SW 761    SMF SW 763    UPF SW 765

NF VIRTUAL LAYER 704 vNIC    vCPU    vRAM    vDRIVE    vSW

NF OPERATING SYSTEMS 703

KERNEL    MODULES    APPLICATIONS    CONTAINERS

NF HARDWARE DRIVERS 702

NIC    CPU    RAM    DRIVE    DSW

NETWORK FUNCTION (NF) HARDWARE 701

NIC    CPU    RAM    DRIVE    DSW

5GNR AN 451

DATA COMMUNICATIONS OVER VIRTUAL LOCAL AREA NETWORKS (VLANS) AND WIRELESS COMMUNICATION NETWORKS

TECHNICAL BACKGROUND

Wireless communication networks provide wireless data services to wireless user devices like providing internet-access to phones and computers. The wireless user devices often execute user applications that use the wireless data services. For example, a user computer may execute a video-editing application that communicates with a video server over a wireless communication network. The wireless communication networks have wireless access nodes that exchange wireless signals with the wireless user devices over wireless communication links. The wireless communications networks transfer the user data (e.g., video data, etc.) over the wireless communication links based on Quality-of-Service (QoS) levels for throughput, latency and the like. A high-priority wireless communication link typically has higher throughput and lower latency than a low-priority communication link. The wireless access nodes exchange this user data with network elements like User Plane Functions (UPFs) that are often connected to the internet. For example, a user computer may communicate with a video server over a wireless access node, UPF, and internet.

Local Area Networks (LANs) serve data communications to user devices at locations like homes and businesses. The LANs are often connected to the internet by routers, and the user devices access the internet over the LAN routers. In some scenarios, the LANs have wireless routers that connect the LANs to the internet over the wireless communication networks.

The LANs deploy Virtual LAN (VLAN) technology that enables the differentiation of data flows by using different VLAN Identifiers (IDs). The VLAN IDs are embedded within individual LAN data flows and allow the LANs to deliver different QoS to the data flows based on their particular VLAN IDs. For example, a high-priority VLAN ID typically has higher data throughput and lower latency than a low-priority VLAN ID.

Unfortunately, a wireless user device may not get sufficient QoS when accessing the internet over a wireless communication network due to bandwidth and power limitations that are imposed on the user device by the wireless communication network. Moreover, the wireless user device may not get sufficient QoS when accessing the internet over a LAN and wireless communication network due to the same bandwidth and power limitations that are imposed on the wireless router by the wireless communication network. In addition, the QoS of the VLANs and the wireless communication networks are not efficiently and effectively controlled to serve the specific needs of the different types of user devices.

TECHNICAL OVERVIEW

A wireless communication device determines QoS levels for wireless network links. The wireless communication device associates the QoS levels for the wireless network links with a Virtual Local Area Network (VLAN). The wireless communication device indicates to a user communication device the association of the QoS levels for the wireless network links with the VLAN. The wireless communication device exchanges user data with the user communication device over the VLAN using the QoS levels for the wireless network links that are associated with the VLAN. The wireless communication device wirelessly exchanges the user data over the wireless network links using the QoS levels for the wireless network links.

A wireless communication device communicates user data over a Virtual Local Area Network (VLAN). The wireless communication device determines Quality-of-Service (QoS) levels for Wireless Wide Area Network (WWAN) links. The wireless communication device associates a Virtual Local Area Network Identifier (VLAN ID) with the QoS levels for the WWAN links. The wireless communication device indicates to a user communication device the associations of the VLAN ID with the QoS levels for the WWAN links. The wireless communication device exchanges the user data with the user communication device over the VLAN ID using the QoS levels for the WWAN links associated with the VLAN ID. The wireless communication device wirelessly exchanges the user data with the WWAN links using the QoS levels for the WWAN links.

A wireless communication device transfers user data over wireless network links. In the wireless communication device, processing circuitry determines Quality-of-Service (QoS) levels for the wireless network links. The processing circuitry associates a VLAN ID with the QoS levels of the wireless network links. Communication circuitry in the wireless communication device indicates to a user communication device the association of the VLAN ID with the QoS levels for the wireless network links. The communication circuitry exchanges the user data with the user communication device over the VLAN ID using the QoS levels for the wireless network links that are associated with the VLAN ID. The communication circuitry wirelessly exchanges the user data with the wireless network links using the QoS levels for the wireless network links.

DESCRIPTION OF THE DRAWINGS

FIG. 2 illustrates an exemplary operation of the wireless communication system to exchange the data between VLANs and wireless network links.

DETAILED DESCRIPTION

Figure 1:
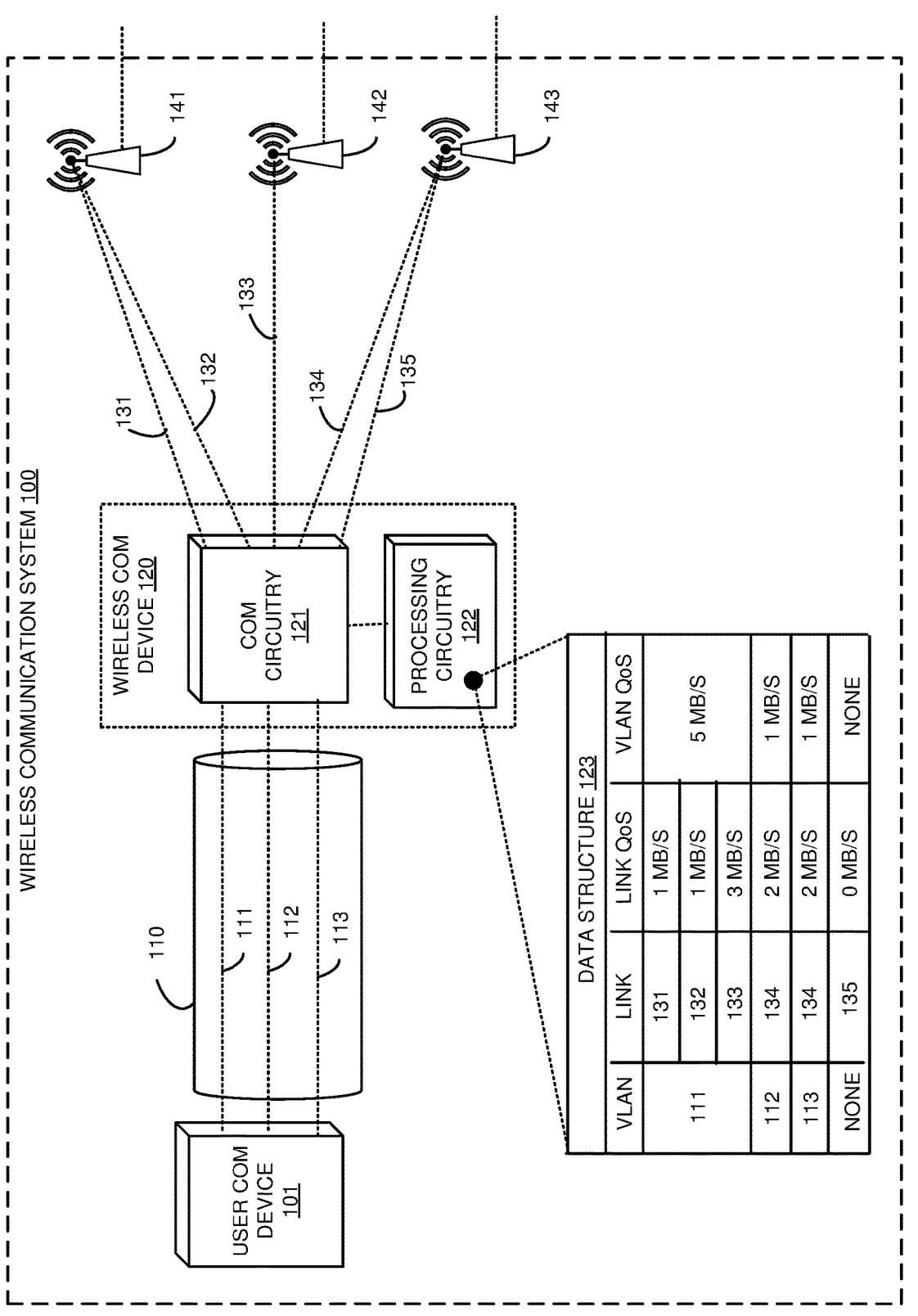
FIG. 1 illustrates an exemplary wireless communication system that exchanges data between Virtual Local Area Networks (VLANs) and wireless network links.

FIG. 1 illustrates exemplary wireless communication system 100 that exchanges data between Virtual Local Area Networks (VLANs) 111-113 and wireless network links 131-135. Wireless communication system 100 comprises user communication (COM) device 101, Local Area Network (LAN) 110, wireless communication device 120, wireless links 131-135, and wireless access nodes 141-143. LAN 110 comprises VLANs 111-113. Wireless communication device 120 comprises communication circuitry 121 and processing circuitry 122. Processing circuitry 122 comprises data structure 123 which is expanded below processing circuitry 122 for clarity Various examples of system operation and configuration are described herein. In some examples, processing circuitry 122 determines Quality-of-Service (QoS) levels for wireless network links 131-135. The QoS levels comprise received signal strength, throughput, latency, error rate, and/or some other data communication quality characteristics. In wireless communication device 120, processing circuitry 122 associates the QoS levels for wireless network links 131-135 with VLANs 111-113. Data structure 123 maintains these associations in processing circuitry 122, and the associations depicted on FIG. 1 are mere examples for illustrative purposes. In this illustrative example, VLAN 111 is associated with wireless links 131-133 which have a combined QoS of 5 megabits per second (MB/S). VLANs 112-113 are associated with wireless link 134 which has a QoS of 2 MB/S which is shared by VLANs 112-113 at the exemplary value of 1 MB/S each. Wireless network link 135 has no effective QoS and is not associated with VLANs 111-113.

Over communication circuitry 121, processing circuitry 122 indicates to user communication device 101 the association of the QoS levels for wireless network links 131-135 with VLANs 111-113. Communication circuitry 121 exchanges user data with user communication device 101 over VLANs 111-113 using the QoS levels for wireless network links 131-134 that are associated with VLANs 111-113. For example, user communication device 101 and communication circuitry 121 exchange user data over VLAN 111 at 5 MB/S. Communication circuitry 121 wirelessly exchanges the user data over wireless network links 131-134 using their own QoS levels. For example, communication circuitry 121 exchanges user data over wireless link 133 at 3 MB/S.

Advantageously, wireless communication device 120 serves user communication device 101 with different QoS levels over different VLANs 111-113. User communication device 101 receives sufficient QoS over wireless network links 131-133 despite network bandwidth and power limitations. Moreover, wireless communication device 120 efficiently and effectively controls the QoS of VLANs 111-113 based on the QoS of wireless network links 131-135 to serve the specific needs of user communication device 101. In this example, VLAN 111 uses wireless links 131-133 to serve significant throughput while VLANs 112-113 share wireless network link 134 for efficiency.

Wireless communication device 120 may serve additional user devices in the manner of user communication device 101. Wireless communication device 120 and user communication device 101 may be fully or partially integrated. In some examples, user communication device 101 and wireless communication device 120 exchange user data over VLANs 111-113 that traverse a single physical connection in LAN 110. In some examples, wireless communication device 120 indicates the QoS levels for wireless network links 131-135 to user communication device 101 over communication circuitry 121 and LAN 110, and in response, user communication device 101 transfers the associations of the QoS levels for wireless network links 131-135 with VLANs 111-113 to wireless communication device 120.

In some examples, wireless communication device 120 determines network addresses for wireless network links 131-135 and individually associates these network addresses with the QoS levels. Wireless communication device 120 and communication circuitry 121 exchange the user data with user communication device 101 over VLANs 111-113 using the network addresses for wireless network links 131-135.

User communication device 101 comprises a computer, phone, controller, and/or some other user apparatus with communication circuitry. LAN 110 may use different types of links like Institute of Electrical and Electronics Engineers 802.3 (Ethernet), IEEE 802.11 (Wi-Fi), Universal Serial Bus (USB), and/or some other data communication protocol. Wireless communication device 120, wireless access nodes 141-143, and possibly user communication device 101 comprise radios that wirelessly communicate using wireless protocols like WIFI, Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and satellite communications.

User communication device 101, wireless communication device 120, and wireless access nodes 141-143 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems and applications. The microprocessors retrieve the software from the memories and execute the software to drive the operation of wireless communication system 100 as described herein.

FIG. 2 illustrates an exemplary operation of wireless communication system 100 to exchange the data between VLANs 111-113 and wireless network links 131-135. The operation may vary in other examples. Wireless communication system 100 determines QoS levels for wireless network links 131-135 (201). Wireless communication system 100 associates the QoS levels for wireless network links 131-135 with VLANs 111-113 (202). Wireless communication system 100 indicates to user communication device 101 these associations of the QoS levels for wireless network links 131-135 with VLANs 111-113 (203). Wireless communication system 100 exchanges user data with user communication device 101 over VLANs 111-113 using the QoS levels for wireless network links 131-135 that are associated with VLANs 111-113 (204). Wireless communication system 100 wirelessly exchanges the user data over wireless network links 131-135 using the QoS levels for wireless network links 131-135 (205).

Figure 3:
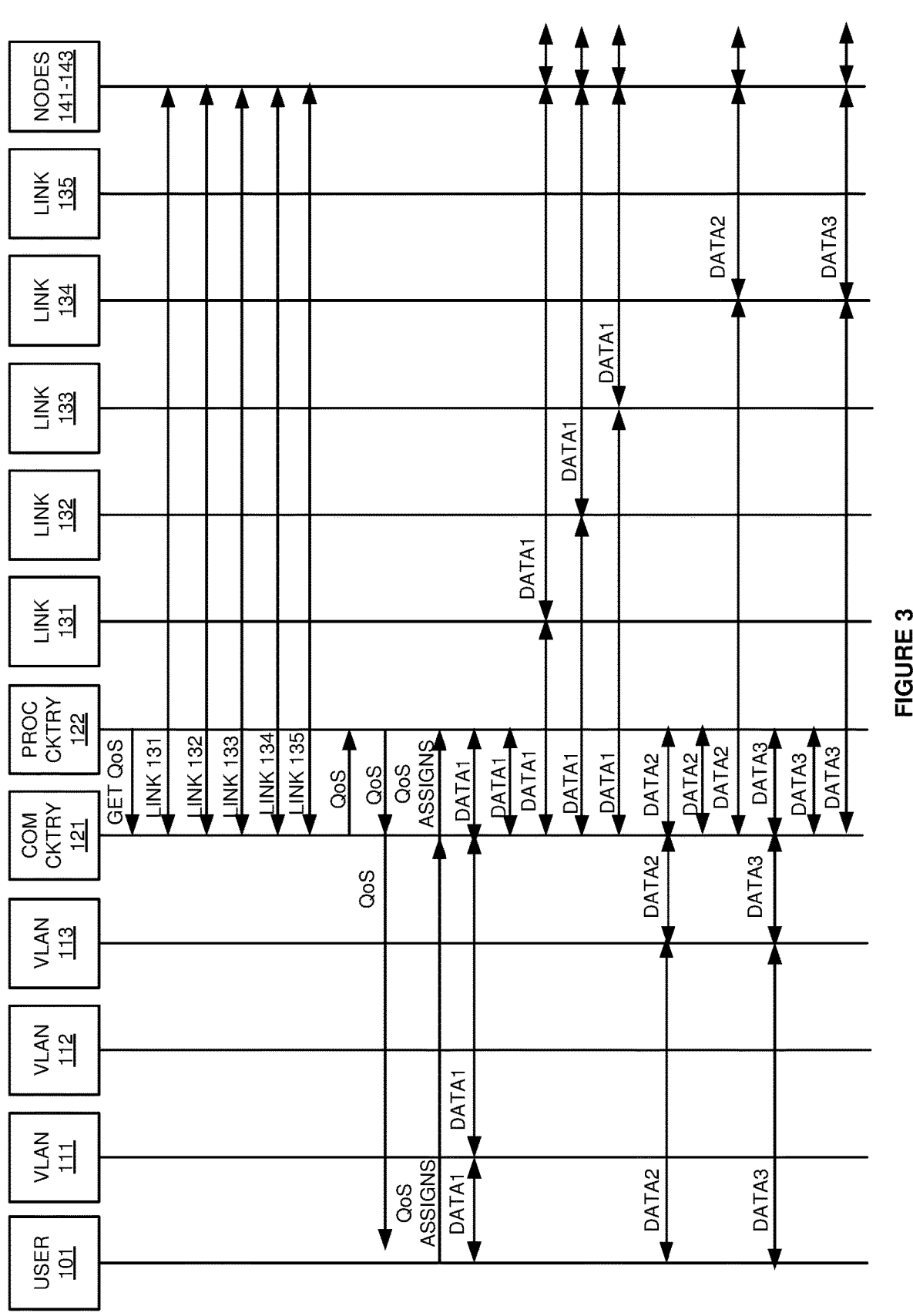
FIG. 3 illustrates an exemplary operation of the wireless communication system to exchange the data between VLANs and wireless network links.

FIG. 3 illustrates an exemplary operation of wireless communication system 100 to exchange user data between VLANs 111-113 and wireless network links 131-135. The operation may vary in other examples. Processing circuitry (proc cktry) 122 directs communication circuitry 121 to establish wireless network links 131-135 and determine their QoS levels. Communication circuitry (com cktry) 121 exchanges signaling with wireless access nodes 141-143 to establish wireless network links 131-135 and to receive network addresses and QoS levels for links 131-135. Communication circuitry 121 indicates the QoS levels and network addresses for links 131-135 to processing circuitry 122. Processing circuitry 122 indicates the QoS levels and network addresses for links 131-135 to user communication device 101 over communication circuitry 121.

User communication device 101 associates the QoS levels and network addresses with VLANs 111-113—possibly under the control of a human operator. User communication device 101 transfers the associations of the QoS levels and network addresses with VLANs 111-113 to processing circuitry 122 over communication circuitry 121. Based on the indications from user communication device 101, processing circuitry 122 associates the QoS levels and network addresses for wireless network links 131-135 with VLANs 111-113. Over communication circuitry 121, processing circuitry 122 confirms to user communication device 101 the associations of the QoS levels and network addresses for wireless network links 131-135 with VLANs 111-113.

Over communication circuitry 121, processing circuitry 122 exchanges first user data (DATA1) with user communication device 101 over VLAN 111 using the QoS levels and network addresses for wireless network links 131-133 that are associated with VLAN 111. Over communication circuitry 121, processing circuitry 122 exchanges DATA1 over wireless network links 131-133 using their own QoS levels and network addresses. Over communication circuitry 121, processing circuitry 122 exchanges second user data (DATA2) with user communication device 101 over VLAN 112 using the QoS level and network address for wireless network link 134 that is associated with VLAN 112. Over communication circuitry 121, processing circuitry 122 exchanges third user data (DATA3) with user communication device 101 over VLAN 113 using the QoS level and network address for wireless network link 134 that is associated with VLAN 113. Due to low QoS, wireless network link 135 is not used in this example.

Figure 4:
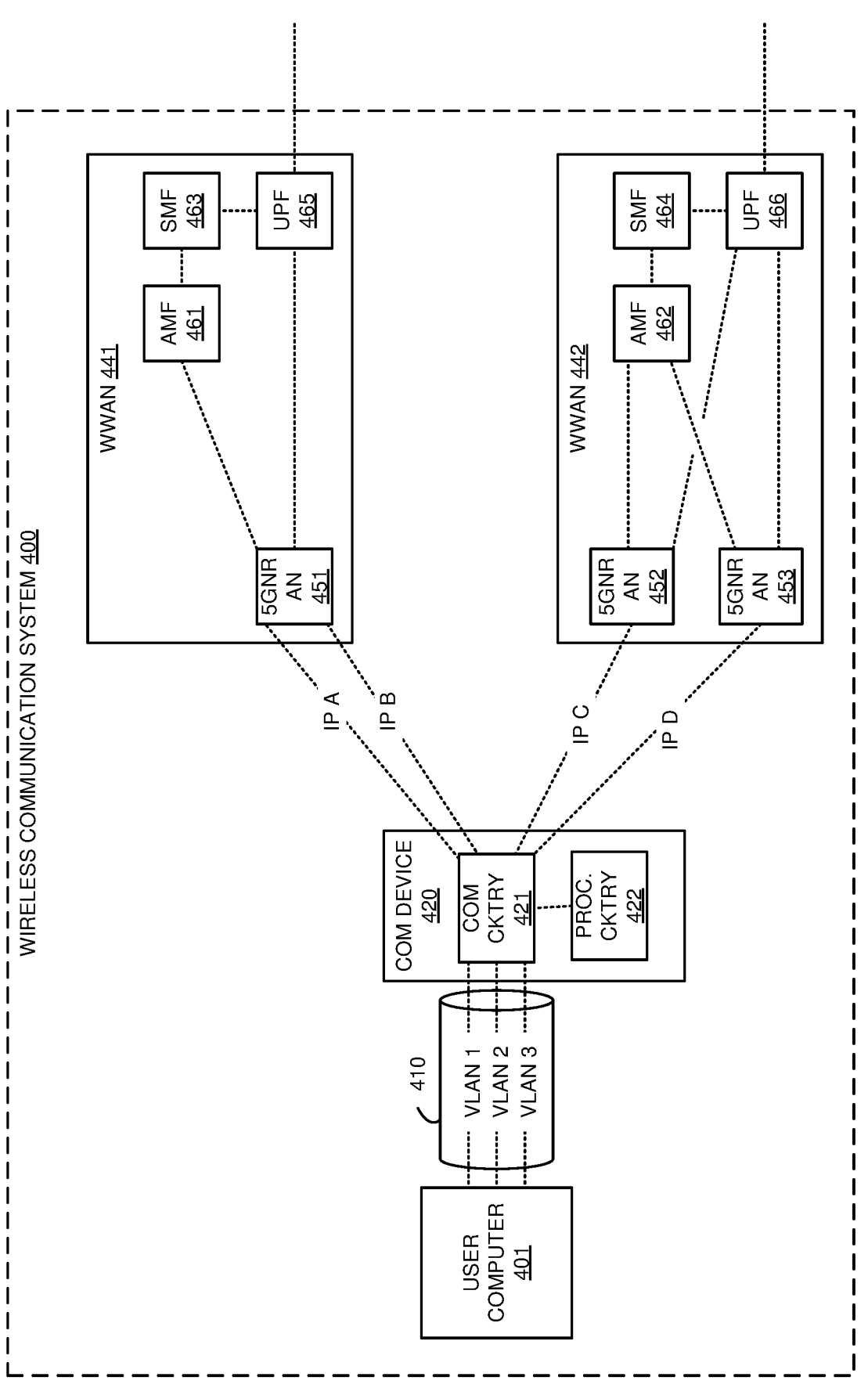
FIG. 4 illustrates an exemplary wireless communication system to exchange data between VLANs and Fifth Generation New Radio (5GNR) networks.

FIG. 4 illustrates exemplary wireless communication system 400 to exchange data between VLANs 1-3 and Wireless Wide Area Networks (WWANS) 441-442. Wireless communication system 400 comprises an example of wireless communication system 100, although wireless communication system 100 may differ. Wireless communication system 400 comprises user computer 401, LAN 410, communication device 420, and WWANs 441-442. LAN 410 comprises VLANs 1-3. Communication device 420 comprises communication circuitry 421 and processing circuitry 422. WWAN 441 comprises 5GNR Access Node (AN) 451, Access and Mobility Management Function (AMF) 461, Session Management Function (SMF) 463, and User Plane Function (UPF) 465. WWAN 442 comprises 5GNR ANs 452-453, AMF 462, SMF 464, and UPF 466.

In communication device 420, processing circuitry 422 directs communication circuitry 421 to establish multiple wireless links. In response, communication circuitry 421 scans for pilot signals and detects 5GNR ANs 451-453. Processing circuitry 422 registers with AMF 461 over communication circuitry 421 and 5GNR AN 451. AMF 461 and SMF 463 exchange signaling to determine an Internet Protocol (IP) address and its Uplink (UL) and Downlink (DL) QoS levels. AMF 461 signals IP address A and its UL and DL QoS to 5GNR AN 451 and to processing circuitry 422. SMF 463 signals UPF 465 with IP address A and its UL and DL QoS.

Processing circuitry 422 registers again with AMF 461 over communication circuitry 421 and 5GNR AN 451. AMF 461 and SMF 463 exchange signaling to determine IP address B and its UL and DL QoS levels. AMF 461 signals IP address B and its UL and DL QoS to 5GNR AN 451 and to processing circuitry 422. SMF 463 signals UPF 465 with IP address B and its UL and DL QoS.

Processing circuitry 422 registers with AMF 462 over communication circuitry 421 and 5GNR AN 452. AMF 462 and SMF 464 exchange signaling to determine IP address C and its UL and DL QoS levels. AMF 462 signals IP address C and its UL and DL QoS to 5GNR AN 452 and to processing circuitry 422. SMF 464 signals UPF 466 with IP address C and its UL and DL QoS.

Processing circuitry 422 registers with AMF 462 over communication circuitry 421 and 5GNR AN 453. AMF 462 and SMF 464 exchange signaling to determine IP address D and its UL and DL QoS levels. AMF 462 signals IP address D and its UL and DL QoS to 5GNR AN 453 and to processing circuitry 422. SMF 464 signals UPF 466 with IP address D and its UL and DL QoS.

Processing circuitry 422 transfers IP addresses A-D and their UL/DL QoS levels to user computer 401 over LAN 410. For the UL, user computer 401 assigns individual IP addresses A, B, C, and D to individual VLANs 1, 2, and 3. In this example, the UL for VLAN 1 is assigned to IP A, the UL for VLAN 2 is assigned to IP B, and the UL for VLAN 3 is assigned to both IP C and IP D. For the DL, the DL for VLAN 1 is assigned to IP A and IP D, the DL for VLAN 2 is assigned to IP B, and the DL for VLAN 3 is assigned to IP C. User computer 401 transfers the VLAN/IP assignments to processing circuitry 422 over LAN 410 and communication circuitry 421. Based on these assignments for the UL, processing circuitry 422 also assigns VLAN 1 to IP A, VLAN 2 to IP B, and VLAN 3 to IP C and IP D. For the DL, processing circuitry 422 assigns VLAN 1 to IP A and IP D, VLAN 2 to IP B, and VLAN 3 to IP C.

User computer 401 transfers IP packets over VLAN 1 using the UL QoS for IP A. The IP packets have IP A as the source address and have a destination IP address. Processing circuitry 422 receives the IP packets over VLAN 1 and communication circuitry 421. Based on the associations, processing circuitry 422 wirelessly transfers the IP packets to 5GNR AN 451 using communication circuitry 421 and the UL QoS for IP A. 5GNR AN 451 transfers the IP packets to UPF 465 using the UL QoS for IP A. UPF 465 translates IP A into a public source address and transfers the IP packets over the internet.

User computer 401 transfers IP packets over VLAN 2 using the UL QoS for IP B. The IP packets have IP B as the source address and have a destination IP address. Processing circuitry 422 receives the IP packets over VLAN 2 and communication circuitry 421. Based on the associations, processing circuitry 422 wirelessly transfers the IP packets to 5GNR AN 451 using communication circuitry 421 and the UL QoS for IP B. 5GNR AN 451 transfers the IP packets to UPF 465 using the UL QoS for IP B. UPF 465 translates IP B into a public source address and transfers the IP packets over the internet.

User computer 401 transfers IP packets over VLAN 3 using the UL QoS for IP C. The IP packets have IP C as the source address and have a destination IP address. Processing circuitry 422 receives the IP packets over VLAN 3 and communication circuitry 421. Based on the associations, processing circuitry 422 wirelessly transfers the IP packets to 5GNR AN 452 using communication circuitry 421 and the UL QoS for IP C. 5GNR AN 452 transfers the IP packets to UPF 466 using the UL QoS for IP C. UPF 466 translates IP C into a public source address and transfers the IP packets over the internet.

User computer 401 also transfers IP packets over VLAN 3 using the UL QoS for IP D. The IP packets have IP D as the source address and have a destination IP address. Processing circuitry 422 receives the IP packets over VLAN 3 and communication circuitry 421. Based on the associations, processing circuitry 422 wirelessly transfers the IP packets to 5GNR AN 453 using communication circuitry 421 and the UL QoS for IP D. 5GNR AN 453 transfers the IP packets to UPF 466 using the UL QoS for IP D. UPF 466 translates IP D into a public source address and transfers the IP packets over the internet.

For the DL, UPF 465 receives IP packets having the public address for IP A as the destination address. UPF 465 translates the public address for IP A to IP A and transfers the IP packets to 5GNR AN 451 using the DL QoS for IP A. 5GNR AN 451 receives the IP packets having IP A and transfers the IP packets to processing circuitry 422 using communication circuitry 421 and the DL QoS for IP A. Processing circuitry 422 receives the IP packets having IP A and transfers the IP packets to user computer 401 using communication circuitry 421, VLAN 1, and the DL QoS for IP A.

UPF 466 receives IP packets having the public address for IP D as the destination address. UPF 466 translates the public address for IP D to IP D and transfers the IP packets to 5GNR AN 453 using the DL QoS for IP D. 5GNR AN 453 receives the IP packets having IP D and transfers the IP packets to processing circuitry 422 using communication circuitry 421 and the DL QoS for IP D. Processing circuitry 422 receives the IP packets having IP D and transfers the IP packets to user computer 401 using communication circuitry 421, VLAN 1, and the DL QoS for IP D. User computer 401 receives the IP packets over VLAN 1 using the DL QoS for IP D.

UPF 465 receives IP packets having the public address for IP B as the destination address. UPF 465 translates the public address for IP B to IP B and transfers the IP packets to 5GNR AN 451 using the DL QoS for IP B. 5GNR AN 451 receives the IP packets having IP B and transfers the IP packets to processing circuitry 422 using communication circuitry 421 and the DL QoS for IP B. Processing circuitry 422 receives the IP packets having IP B and transfers the IP packets to user computer 401 using communication circuitry 421, VLAN 2, and the DL QoS for IP B.

UPF 466 receives IP packets having the public address for IP C as the destination address. UPF 466 translates the public address for IP C to IP C and transfers the IP packets to 5GNR AN 452 using the DL QoS for IP C. 5GNR AN 452 receives the IP packets having IP C and transfers the IP packets to processing circuitry 422 using communication circuitry 421 and the DL QoS for IP C. Processing circuitry 422 receives the IP packets having IP C and transfers the IP packets to user computer 401 using communication circuitry 421, VLAN 3, and the DL QoS for IP C.

Advantageously, VLAN 1 has the combined DL QoS of IP A and IP D, while VLAN 3 has the combined UL QoS of IP C and IP D. User computer 401 may assign UL/DL WWAN QoS to individual VLANs 1-3 as needed. A single VLAN may use a combination of WWAN links to transfer large amounts of UL data and/or DL data. Multiple VLANs may share a single WWAN link to efficiently transfer smaller amounts of UL data and/or DL data.

Figure 5:
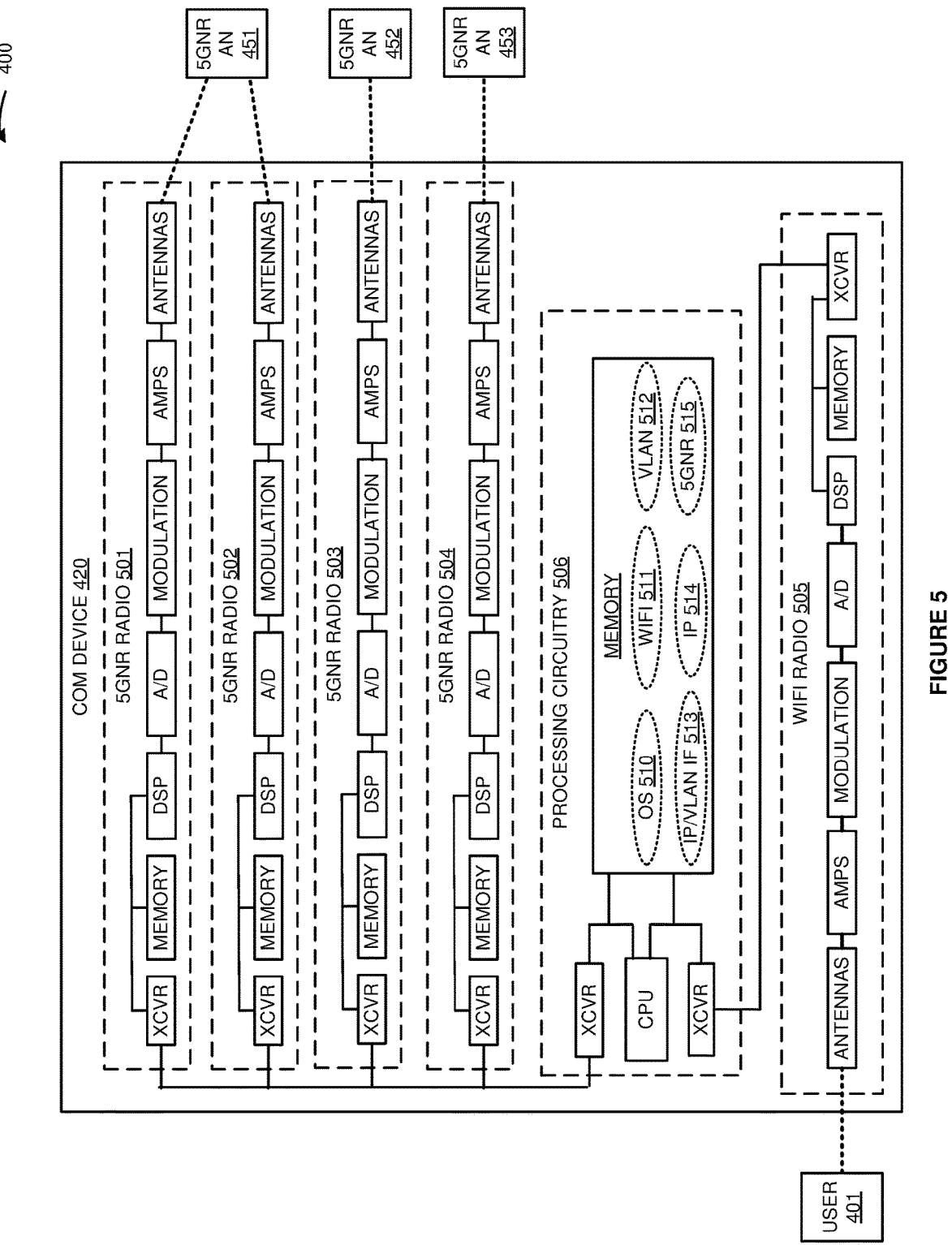
FIG. 5 illustrates an exemplary communication device to exchange the data between the VLANs and the 5GNR networks.

FIG. 5 illustrates exemplary communication device 420 in wireless communication system 400 to exchange the data between VLANs 1-3 and 5GNR ANs 451-453. Communication device 420 represents an example of wireless communication device 120, although wireless communication device 120 may differ. Communication device 420 comprises 5GNR radios 501-504, WIFI radio 505, and processing circuitry 506. Radios 501-505 comprises an example of communication circuitry 121 and 421, although communication circuitry 121 may differ. Processing circuitry 506 comprises an example of processing circuitry 122 and 422, although processing circuitry 122 may differ. Radios 501-505 comprise antennas, amplifiers, filters, modulation, analog-to-digital interfaces, DSP, memory, and transceivers that are coupled over bus circuitry. Processing circuitry 506 comprises CPU, memory, and transceivers (XCVRs) that are coupled over bus circuitry. The memory in processing circuitry 506 stores software like Operating System (OS) 510, WIFI 511, VLAN 512, IP/VLAN Interface (IF) 513, IP 515, and 5GNR 515. The antennas in 5GNR radios 501-502 exchange 5GNR signals with 5GNR AN 451. The antennas in 5GNR radio 503 exchanges 5GNR signals with 5GNR AN 452. The antennas in 5GNR radio 504 exchanges 5GNR signals with 5GNR AN 453. The antennas in WIFI radio 505 exchange WIFI signals with user computer 401. The transceivers in radios 501-505 are coupled to transceivers in processing circuitry 506. In processing circuitry 506, the CPU retrieves software 510-515 from the memory and executes software 510-515 to direct the operation of processing circuitry 506 as described herein.

Figure 6:
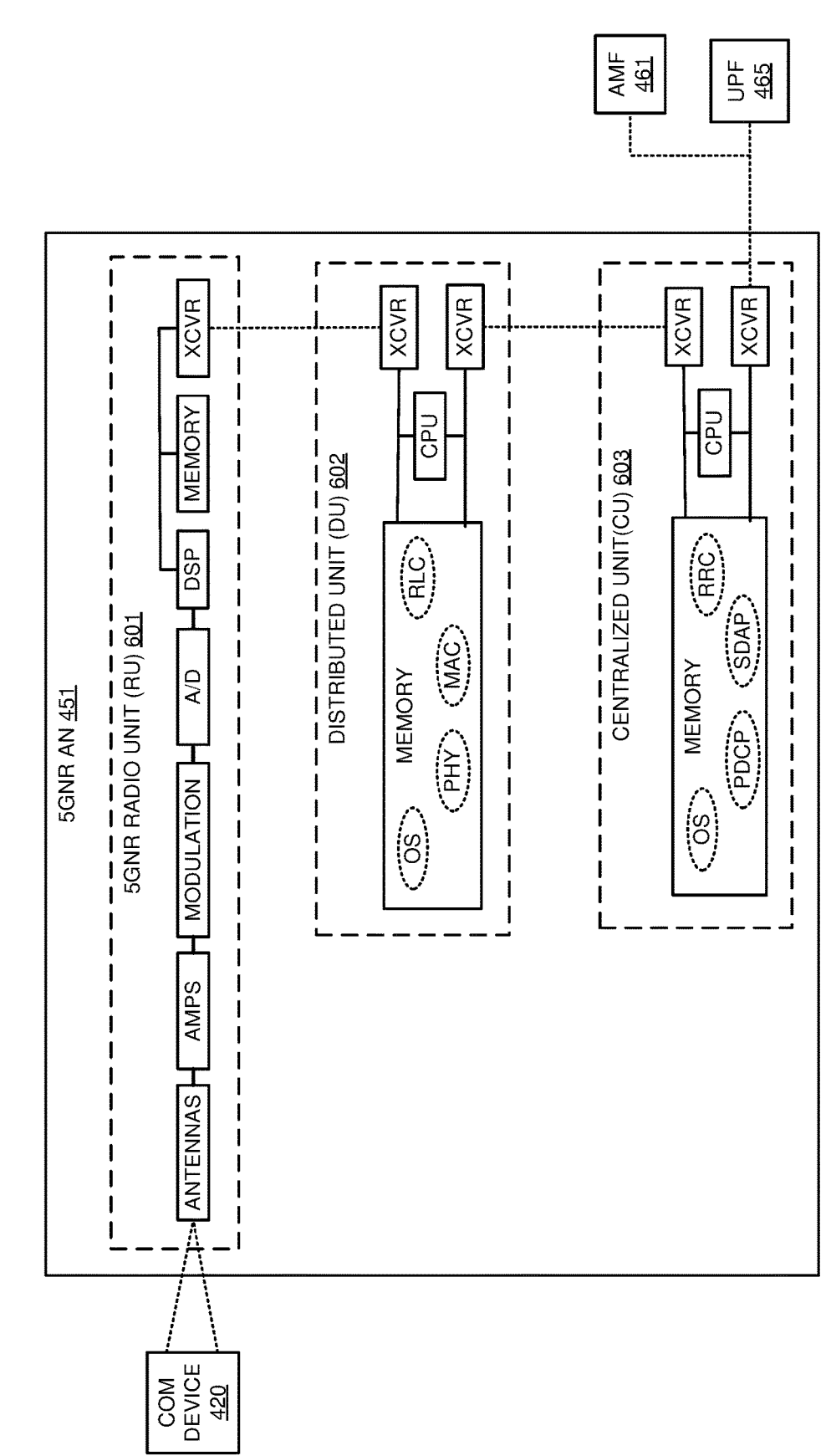
FIG. 6 illustrates an exemplary 5GNR access node in the 5GNR networks.

FIG. 6 illustrates exemplary 5GNR AN 451 in wireless communication system 400. 5GNR AN 451 comprises and example of wireless ANs 141-143 and 452-453, although ANs 141-143 and 452-453 may differ. 5GNR AN 451 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for Physical Layer (PHY), Media Access Control (MAC), and Radio Link Control (RLC). CU 603 comprises memory, CPU, and transceivers that are coupled over bus circuitry. The memory in CU 603 stores an operating system and 5GNR network applications for Packet Data Convergence Protocol (PDCP), Service Data Adaption Protocol (SDAP), and Radio Resource Control (RRC). The antennas in 5GNR RU 601 are wirelessly coupled to communication device 420 over 5GNR links. Transceivers in 5GNR RU 601 are coupled to transceivers in DU 602. Transceivers in DU 602 are coupled to transceivers in CU 603. Transceivers in CU 603 are coupled AMF 461 and UPF 465. The DSP and CPU in RU 601, DU 602, and CU 603 execute the radio applications, operating systems, and network applications to exchange data and signaling with communication device 420, AMF 461, and UPF 465 as described herein.

Figure 7:
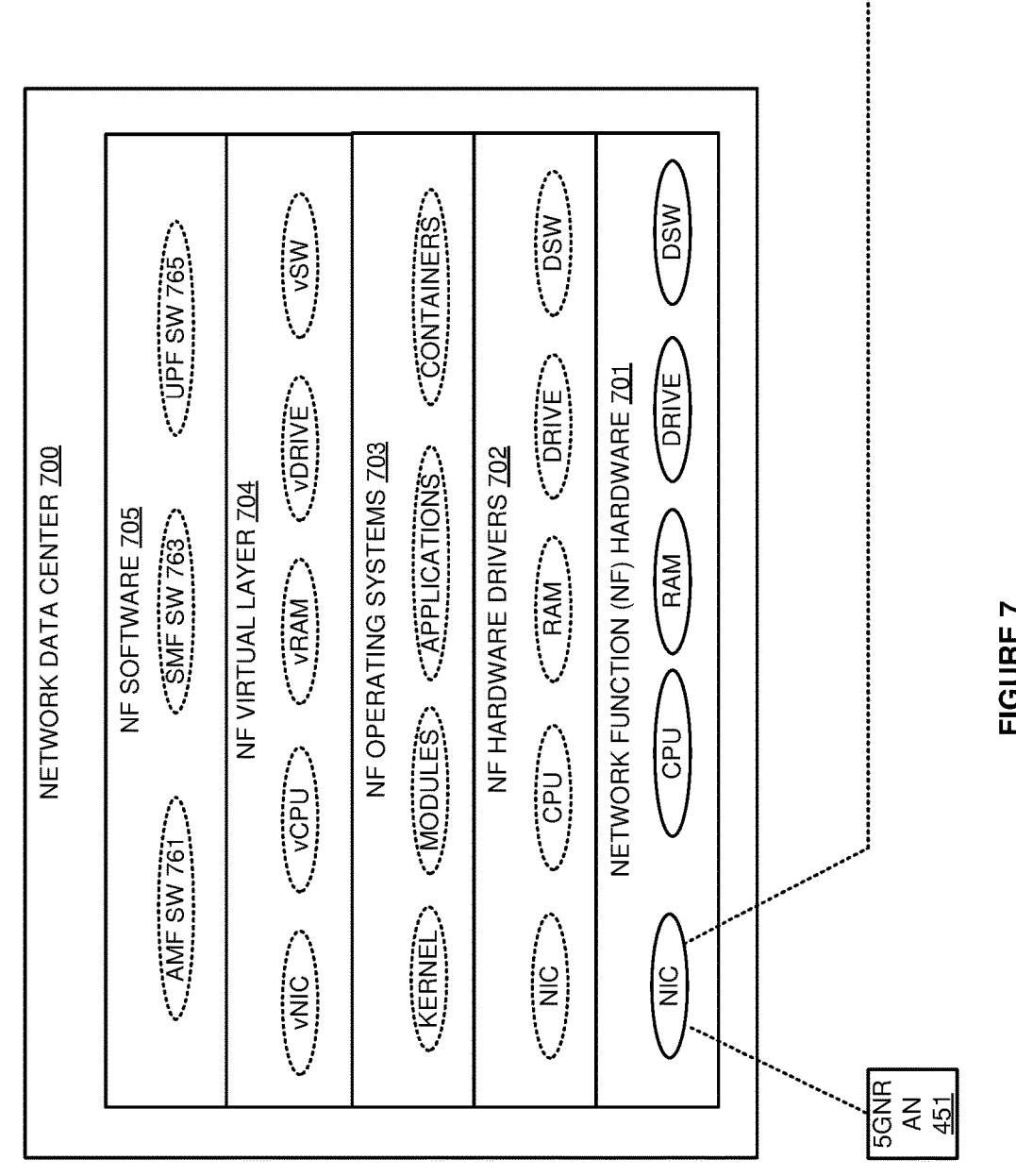
FIG. 7 illustrates an exemplary data center in the 5GNR networks.

FIG. 7 illustrates exemplary network data center 700 in wireless communication system 400. Network data center 700 comprises an example of AMFs 461-462, SMFs 463-464, and UPFs 465-466, although these Network Functions (NFs) may differ. Network data center 700 comprises NF hardware 701, NF hardware drivers 702, NF operating systems 703, NF virtual layer 704, and NF Software (SW) 705. NF hardware 701 comprises Network Interface Cards (NICs), CPU, RAM, Flash/Disk Drives (DRIVE), and Data Switches (DSW). NF hardware drivers 702 comprise software that is resident in the MC, CPU, RAM, DRIVE, and DSW. NF operating systems 703 comprise kernels, modules, applications, and containers. NF virtual layer 704 comprises vNIC, vCPU, vRAM, vDRIVE, and vSW. NF SW 705 comprises AMF SW 761, SMF SW 763, and UPF SW 765. Other NF SW like Network Repository Function (NRF) SW is typically present but is omitted for clarity. Network data center 700 may be located at a single site or be distributed across multiple geographic locations. The NIC in NF hardware 701 are coupled to 5GNR AN 451 and external systems. NF hardware 701 executes NF hardware drivers 702, NF operating systems 703, NF virtual layer 704, and NF SW 705 to form and operate AMF 461, SMF 463, and UPF 465 as described herein.

Figure 8:
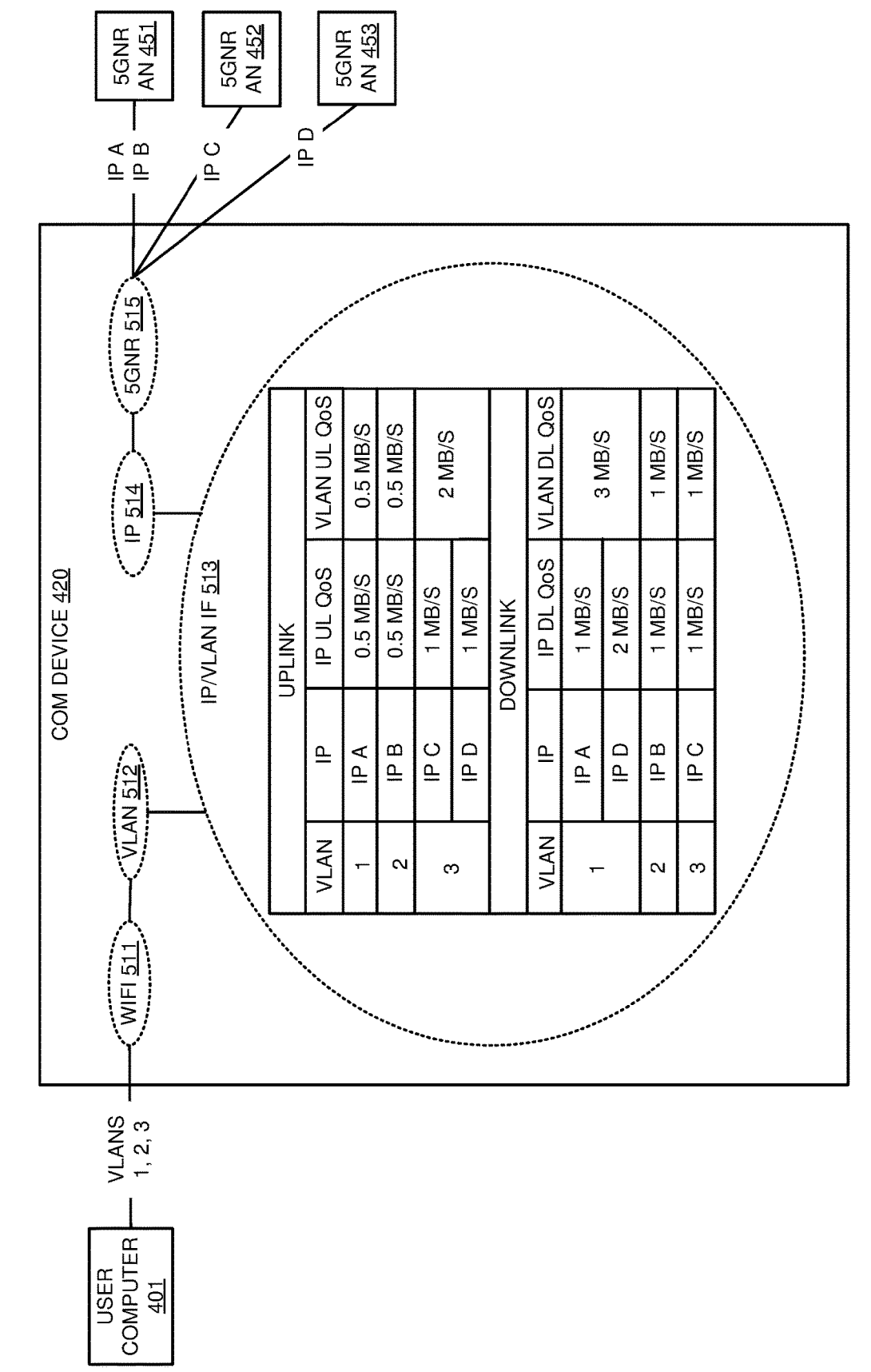
FIG. 8 illustrates the exemplary communication device to exchange the data between the VLANs and the 5GNR networks.

FIG. 8 further illustrates exemplary communication device 420 in wireless communication system 400 to exchange the data between VLANs 1-3 and 5GNR ANs 451-453. User computer 401 communicates with WIFI software 511 and VLAN software 512 in communication device 420 over VLANs 1-3. 5GNR ANs 451-453 communicate with 5GNR software 515 and IP software 514 in communication device 420 over IP A, IP B, IP C, and IP D. IP/VLAN IF software 513 interworks between VLANs 1-3 and IP addresses A-D based on the selected associations.

In this example, the UL for VLAN 1 is assigned to IP A, the UL for VLAN 2 is assigned to IP B, and the UL for VLAN 3 is assigned to both IP C and IP D. Also in this example, the DL for VLAN 1 is assigned to both IP A and IP D, the DL for VLAN 2 is assigned to IP B, and the DL for VLAN 3 is assigned to IP C. User computer 401 may assign UL/DL WWAN QoS to its VLANs based on QoS need. A single VLAN may use a combination of WWAN links to transfer large amounts of UL and/or DL data. Multiple VLANs may share a single WWAN link to transfer smaller amounts of UL and/or DL data.

Figure 9:
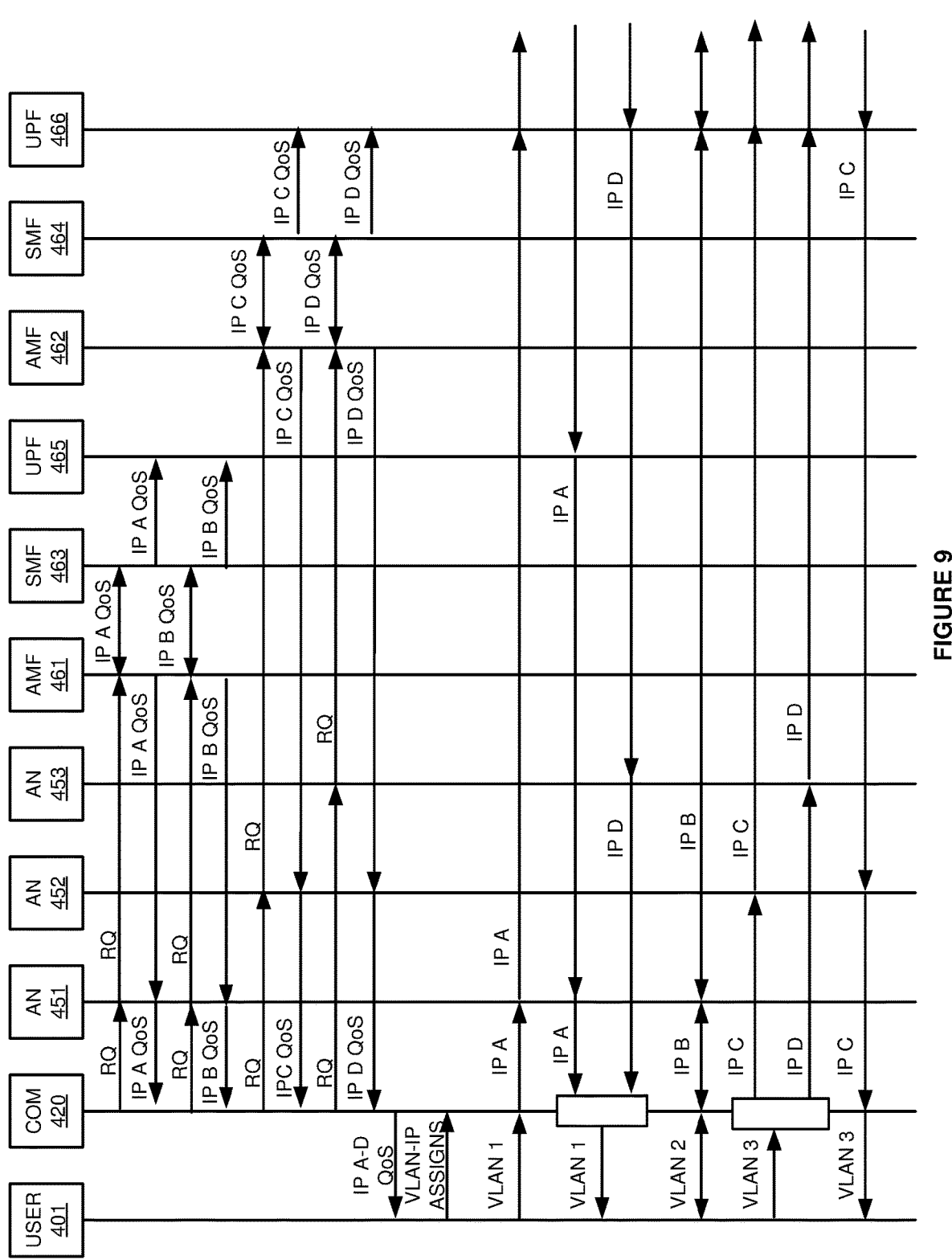
FIG. 9 illustrates an exemplary operation of the wireless communication system to exchange the data between the VLANs and the 5GNR networks.

FIG. 9 illustrates an exemplary operation of wireless communication system 100 to exchange the data between VLANs 1-3 and IP addresses A-D. Communication device 420, requests (RQ) service from AMF 461 over 5GNR AN 451. AMF 461 and SMF 463 exchange signaling to determine IP address A and its UL and DL QoS levels. AMF 461 signals IP address A and its UL and DL QoS to 5GNR AN 451 which signals IP address A and its UL and DL QoS and to communication device 420. SMF 463 signals UPF 465 with IP address A and its UL and DL QoS.

Using a different radio, communication device 420, requests additional service from AMF 461 over 5GNR AN 451. AMF 461 and SMF 463 exchange signaling to determine IP address B and its UL and DL QoS levels. AMF 461 signals IP address B and its UL and DL QoS to 5GNR AN 451 which signals the IP address B and its UL and DL QoS and to communication device 420. SMF 463 signals UPF 465 with IP address B and its UL and DL QoS.

Communication device 420, requests service from AMF 462 over 5GNR AN 452. AMF 462 and SMF 464 exchange signaling to determine IP address C and its UL and DL QoS levels. AMF 462 signals IP address C and its UL and DL QoS to 5GNR AN 452 which signals IP address C and its UL and DL QoS to communication device 420. SMF 464 signals UPF 466 with IP address C and its UL and DL QoS.

Communication device 420 requests service from AMF 462 over 5GNR AN 453. AMF 462 and SMF 464 exchange signaling to determine IP address D and its UL and DL QoS levels. AMF 462 signals IP address D and its UL and DL QoS to 5GNR AN 453 which signals IP address D and its UL and DL QoS to communication device 420. SMF 464 signals UPF 466 with IP address D and its UL and DL QoS.

Communication device 420 transfers IP addresses A-D and their UL/DL QoS levels to user computer 401. For the UL, user computer 401 assigns individual IP addresses A, B, C, and D to individual VLANs 1, 2, and 3. In this example, the UL for VLAN 1 is assigned to IP A, the UL for VLAN 2 is assigned to IP B, and the UL for VLAN 3 is assigned to both IP C and IP D. The DL for VLAN 1 is assigned to both IP A and IP D, the DL for VLAN 2 is assigned to IP B, and the DL for VLAN 3 is assigned to IP C. User computer 401 transfers the VLAN/IP assignments to communication device 420.

User computer 401 transfers IP packets over VLAN 1 using the UL QoS for IP A. The IP packets have IP A as the source address. Communication device 420 receives the IP packets over VLAN 1. Based on the associations, communication device 420 wirelessly transfers the IP packets to 5GNR AN 451 using the UL QoS for IP A. 5GNR AN 451 transfers the IP packets to UPF 465 using the UL QoS for IP A. UPF 465 transfers the IP packets over the internet.

For the VLAN 1 DL, UPF 465 receives IP packets for IP A. UPF 465 transfers the IP packets to 5GNR AN 451 using the DL QoS for IP A. 5GNR AN 451 transfers the IP packets to communication device 420 using the DL QoS for IP A. Communication device 420 transfers the IP packets to user computer 401 using VLAN 1 and the DL QoS for IP A. In addition, UPF 466 receives IP packets for IP D. UPF 466 transfers the IP packets to 5GNR AN 453 using the DL QoS for IP D. 5GNR AN 453 transfers the IP packets to communication device 420 using the DL QoS for IP D. Communication device 420 transfers the IP packets to user computer 401 using VLAN 1 and the DL QoS for IP D.

User computer 401 exchanges IP packets over VLAN 2 using the UL/DL QoS for IP B. The IP packets have IP B as the source address on the UL and IP B as the destination address on the DL. Communication device 420 exchanges the IP packets with 5GNR AN 452 using the UL/DL QoS for IP B. 5GNR AN 452 exchanges the IP packets with UPF 466 using the UL/DL QoS for IP B. UPF 466 exchanges the IP packets over the internet.

User computer 401 transfers IP packets over VLAN 3 using the UL QoS for IP C. The IP packets have IP C as the source address. Communication device 420 transfers the IP packets to 5GNR AN 452 using the UL QoS for IP C. 5GNR AN 452 transfers the IP packets to UPF 466 using the UL QoS for IP C. UPF 466 transfers the IP packets over the internet. Also for VLAN 3, user computer 401 transfers IP packets over VLAN 3 using the UL QoS for IP D. The IP packets have IP D as the source address. Communication device 420 transfers the IP packets to 5GNR AN 453 using the UL QoS for IP D. 5GNR AN 453 transfers the IP packets to UPF 466 using the UL QoS for IP D. UPF 466 transfers the IP packets over the internet.

For the VLAN 3 DL, UPF 466 receives IP packets for IP C. UPF 466 transfers the IP packets to 5GNR AN 452 using the DL QoS for IP C. 5GNR AN 452 transfers the IP packets to communication device 420 using the DL QoS for IP C. Communication device 420 transfers the IP packets to user computer 401 over VLAN 3 using the DL QoS for IP C.

Figure 10:
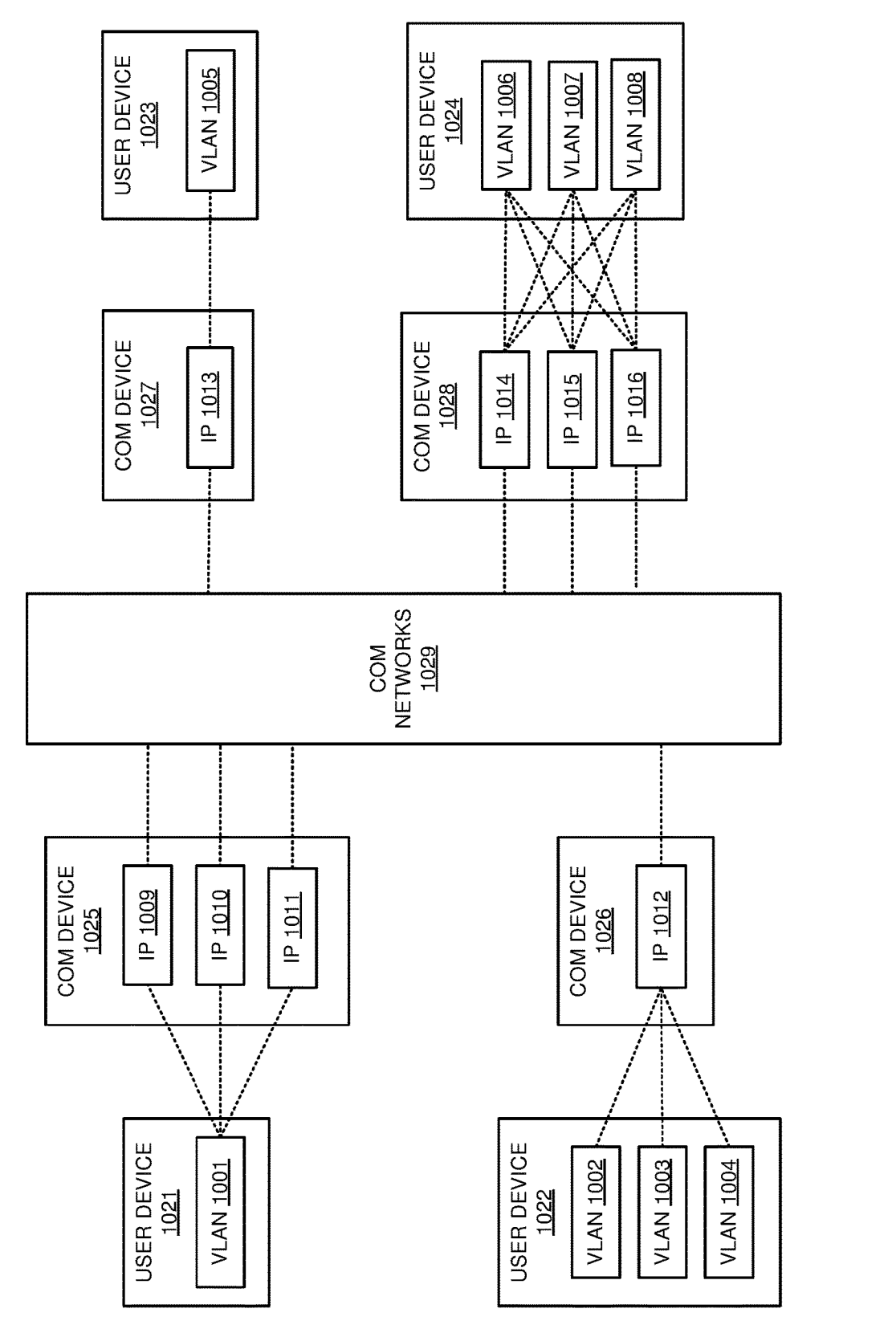
FIG. 10 illustrates an exemplary wireless communication system to exchange data between VLANs and Internet Protocol (IP) addresses using various VLAN/IP address configurations.

FIG. 10 illustrates exemplary wireless communication system 1000 to exchange data between VLANs 1001-1008 and communication networks 1029 using various VLAN-to-IP address configurations. Wireless communication system 1000 comprises user devices 1021-1024, communication devices 1025-1028, and communication networks 1029. Communication devices 1025-1028 represent examples of communication device 120 and 420, although devices 120 and 420 may differ.

User device 1021 uses single VLAN 1001 to communicate with communication networks 1029 over communication device 1025 and multiple IP addresses 1009-1011 in a one-to-many VLAN/IP address configuration. User device 1022 uses multiple VLANs 1002-1004 to communicate with communication networks 1029 over communication device 1026 and single IP address 1012 in a many-to-one VLAN/IP address configuration. User device 1023 uses one VLAN 1005 to communicate with communication networks 1029 over communication device 1027 and one IP address 1013 in a one-to-one VLAN/IP address configuration. User device 1024 uses many VLANs 1006-1008 to communicate with communication networks 1029 over communication device 1028 and many IP addresses 1014-1016 in a many-to-many VLAN/IP address configuration.

User devices 1021-1024 may control these configurations by assigning IP addresses 1009-1016 to VLANs 1001-1008 as needed and directing communication devices 1025-1028 to implement the VLAN/IP address assignments. Alternatively, communication devices 1025-1028 may handle the assignments for user devices 1021-1024. The various VLAN/IP configurations include one-to-many, many-to-one, one-to-one, and many-to-many.

Advantageously, user devices 1021-1024 receive various levels of QoS over IP addresses A-D. Moreover, wireless communication devices 1025-1028 efficiently and effectively controls the QoS of VLANs 1001-1008 based on the QoS of IP addresses A-D to serve the specific needs of user devices 1021-1024. In this example, VLAN 1001 uses IP addresses 1009-1011 to serve significant throughput while VLANs 1002-1004 share IP address 1012 for efficiency.

As will be appreciated by one skilled in the art, aspects of the present invention may be embodied as a system, method, or computer program product. Furthermore, the wireless data network circuitry described above comprises computer hardware and software that form special-purpose wireless system circuitry to exchange the data between VLANs and wireless networks. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control.

Due to this automated execution, the presence of the higher-level software in memory physically changes the structure of the computer hardware machines into special-purpose wireless system circuitry to exchange data between VLANs and wireless networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to transfer user data, the method comprising:
determining Quality-of-Service (QoS) levels for wireless network links;
indicating the QoS levels for the wireless network links to a user communication device;
receiving, from the user communication device, associations of the QoS levels for the wireless network links with a Virtual Local Area Network (VLAN) and in response, associating the QoS levels for the wireless network links with the VLAN based on the associations received from the user communication device;
confirming the associations of the QoS levels for the wireless network links with the VLAN to the user communication device;
exchanging the user data with the user communication device over the VLAN using the QoS levels for the wireless network links that are associated with the VLAN; and
wirelessly exchanging the user data over the wireless network links using the QoS levels for the wireless network links.

2. The method of claim 1 wherein exchanging the user data with the user communication device over the VLAN comprises exchanging the user data with the user communication device over a single Local Area Network (LAN) connection.

3. The method of claim 1 wherein exchanging the user data with the user communication device over the VLAN comprises exchanging the user data with the user communication device over an Institute of Electrical and Electronics Engineers (IEEE) 802.3 (Ethernet) connection.

4. The method of claim 1 wherein exchanging the user data with the user communication device over the VLAN comprises exchanging the user data with the user communication device over an Institute of Electrical and Electronics Engineers (IEEE) 802.11 (Wi-Fi) connection.

5. The method of claim 1 wherein exchanging the user data with the user communication device over the VLAN comprises exchanging the user data with the user communication device over a Universal Serial Bus (USB) connection.

6. The method of claim 1 wherein the user communication device determines the associations based on an input received from a human operator.

7. The method of claim 1 wherein:
determining the QoS levels for wireless network links comprises signaling a wireless access node to establish the wireless network links and to determine network addresses and the QoS levels for the wireless network links;

indicating to the user communication device the QoS levels for the wireless network links comprises indicating to the user communication device the network addresses and the QoS levels for the wireless network links;

receiving, from the user communication device, the associations of the QoS levels for the wireless network links with the VLAN and associating the QoS levels for the wireless network links with the VLAN comprises receiving, from the user communication device, individual associations of the network addresses with the VLAN and associating the network addresses and the VLAN based on the individual associations received from the user communication device; and exchanging the user data with the user communication device over the VLAN using the QoS levels comprises exchanging the user data with the user communication device over the VLAN using the network addresses and the QoS levels individually associated with the VLAN.

8. A method of operating a wireless communication device to communicate user data over a Virtual Local Area Network (VLAN), the method comprising:

the wireless communication device determining Quality-of-Service (QoS) levels for Wireless Wide Area Network (WWAN) links;

the wireless communication device indicating the QoS levels for the WWAN links to the user communication device;

the wireless communication device receiving from the user communication device, associations of a Virtual Local Area Network Identifier (VLAN ID) with the QoS levels for the WWAN links and in response, associating the VLAN ID with the QoS levels for the WWAN links based on the associations received from the user communication device;

the wireless communication device confirming the associations of the VLAN ID with the QoS levels for the WWAN links to the user communication device;

the wireless communication device exchanging the user data with the user communication device over the VLAN ID using the QoS levels for the WWAN links associated with the VLAN ID; and the wireless communication device wirelessly exchanging the user data with the WWAN links using the QoS levels for the WWAN links.

9. The method of claim 8 further comprising:

the wireless communication device determining network addresses for the WWAN links; and wherein:

the wireless communication device indicating the QoS levels for the WWAN links to the user communication device comprises indicating the QoS levels and the network addresses for the WWAN links to the user communication device; and the wireless communication device receiving from the user communication device, the associations of the VLAN ID with the QoS levels for the WWAN links and associating the VLAN ID with the QoS levels comprises receiving from the user communication device, the associations of the VLAN ID with the QoS levels and the network addresses and in response, associating the VLAN ID with the network addresses and the QoS levels.

10. The method of claim 9 wherein:

the wireless communication device exchanging the user data with the user communication device over the VLAN ID using the QoS levels for the WWAN links comprises exchanging the user data with the user communication device over the VLAN ID using the network addresses and the QoS levels for the WWAN links associated with the VLAN ID.

11. The method of claim 8 wherein the user communication device determines the associations based on an input received from a human operator.

12. The method of claim 8 wherein the wireless communication device determining the QoS levels for the WWAN links comprises signaling a wireless access node to establish the WWAN links and to determine network addresses and the QoS levels for the WWAN links.

13. The method of claim 8 wherein the wireless communication device exchanging the user data with the user communication device over the VLAN ID using the QoS levels for the WWAN links comprises receiving video data from the user communication device; and the wireless communication device wirelessly exchanging the user data with the WWAN links using the QoS levels for the WWAN links comprises transferring the video data to the WWAN links.

14. The method of claim 8 wherein the wireless communication device exchanging the user data with the user communication device over the VLAN ID using the QoS levels for the WWAN links comprises exchanging the user data with the user communication device over at least one of an Institute of Electrical and Electronics Engineers (IEEE) 802.3 (Ethernet) link, an IEEE 802.11 (Wi-Fi) link, and a Universal Serial Bus (USB) link.

15. A wireless communication device to transfer user data over wireless network links, the wireless communication device comprising:

processing circuitry configured to determine Quality-of-Service (QoS) levels for the wireless network links;

communication circuitry configured to indicate the QoS levels for the wireless network links to the user communication device and receive from the user communication device associations of a Virtual Local Area Network Identifier (VLAN ID) with the QoS levels of the wireless network links;

the processing circuitry configured to associate the VLAN ID with the QoS levels of the wireless network links based on the associations received from the user communication device;

the communication circuitry further configured to confirm the associations of the VLAN ID with the QoS levels for the wireless network links to the user communication device;

the communication circuitry further configured to exchange the user data with the user communication device over the VLAN ID using the QoS levels for the wireless network links that are associated with the VLAN ID; and the communication circuitry further configured to wirelessly exchange the user data with the wireless network links using the QoS levels for the wireless network links.

16. The wireless communication device of claim 15 wherein the communication circuitry is further configured to:

determine the QoS levels and network addresses for the wireless network links;

indicate the network addresses and the QoS levels for the wireless network links to the user communication device; and receive, from the user communication device, individual associations of the network addresses and the QoS levels for the wireless network links with the VLAN ID.

17. The wireless communication device of claim 16 wherein:

the communication circuitry is configured to exchange the user data with the user communication device over the VLAN ID using the network addresses and the QoS levels for the wireless network links individually associated with the VLAN ID to exchange the user data with the user communication device over the VLAN ID using the QoS levels for the wireless network links.

18. The wireless communication device of claim 15 wherein the user communication device determines the associations based on an input received from a human operator.

19. The wireless communication device of claim 15 wherein the communication circuitry is further configured to signal a wireless access node to establish the wireless network links and to determine the QoS levels and network addresses for the wireless network links.

20. The wireless communication device of claim 15 wherein the communication circuitry is configured to receive video data from the user communication device to exchange the user data with the user communication device over the VLAN ID using the QoS levels for the wireless network links; and the communication circuitry is configured to wirelessly transfer the video data to the wireless network links to wirelessly exchange the user data with the wireless network links using the QoS levels for the wireless network links.

\* \* \* \* \*